United States Patent Office 3,574,184
Patented Apr. 6, 1971

3,574,184
PROCESS OF PREPARING A FERRIC
HYDROXIDE-DEXTRAN COMPLEX
Ranulph Michael Alsop, Alderley Edge, England, and Ian Bremner, Cults, Scotland, assignors to Fisons Pharmaceuticals Limited, Loughborough, Leicestershire, England
No Drawing. Filed May 7, 1968, Ser. No. 727,343
Claims priority, application Great Britain, May 13, 1967, 22,280/67
Int. Cl. C08b 25/04
U.S. Cl. 260—209
7 Claims

ABSTRACT OF THE DISCLOSURE

Provided is a process for the preparation of a ferric hydroxide-dextran complex. An aqueous solution of a water-soluble ferric salt is slowly neutralized by the addition of alkali at such a rate that from 10 to 90% of the ferric salt is converted to colloidal ferric hydroxide in not less than 30 minutes. The neutralization is carried out at from 20 to 40° C. An aqueous solution of a dextran is added to the resultant solution and the pH adjusted to 4 to 7. Heating the solution at at least 50° C. effects formation of a stable ferric hydroxide-dextran complex.

---

The present invention relates to iron-dextran complexes and their production.

Iron-dextran complexes are used in the treatment of iron-deficiency anaemia and are generally prepared by the reaction of dextran with ferric hydroxide, which has been formed in situ in the presence of the dextran by the double decomposition reaction of a decomposable ferric salt and an alkali. The use of colloidal ferric hydroxide which has been preformed has also been proposed.

We have now found that if the colloidal ferric hydroxide is preformed under controlled conditions, the ferric hydroxide is produced in a form which will more readily form complexes with dextrans.

Accordingly, the present invention provides a process for the preparation of a ferric hydroxide-dextran complex, which process comprises forming an aqueous solution of at least one water-soluble ferric salt and slowly neutralising the solution by the addition of alkali at such a rate that from 10 to 90% of the ferric salt is converted to colloidal ferric hydroxide in not less than 30 minutes, the neutralisation being carried out at a temperature of from 20 to 40° C.; thereafter adding an aqueous solution of a dextran to the resultant solution and adjusting the pH of the solution to a value of from 4 to 7; and subsequently heating the solution at a temperature of at least 50° C. for a sufficient period to effect the formation of a stable ferric hydroxide-dextran complex.

Suitable ferric salts for use in the process of the invention include ferric chloride, ferric nitrate, ferric perchlorate, ferric trichloracetate, ferric citrate, ferric ammonium citrate, ferric ammonium acetate and ferric oxy salts.

Suitable alkalis are ammonium and alkali-metal, such as sodium or potassium, hydroxides, carbonates and bicarbonates, sodium carbonate being preferred.

The neutralisation of the ferric salt with the alkali to yield the colloidal ferric hydroxide must be carried out at a controlled rate, in order that less than 90% of the salt is neutralised in not less than 30 minutes from the start of the neutralisation reaction. The addition of the alkali may be made continuously or in several portions. It is preferred to carry out the neutralisation at such a rate from 50 to 80% of the ferric salt is neutralised over a period of not less than 30 minutes.

When the initial partial neutralisation of the ferric salt has been carried out, the dextran solution is added and further alkali is added to raise the pH of the mixture to a value of from 4 to 7. The alkali employed is desirably the same as that used in the initial stage of the process of the invention.

By the term dextran as used herein we mean a partially depolymerised dextran having a weight average molecular weight in the range of, for example, 500–50,000 preferably in the range 1,000–10,000 and modified forms or derivatives of dextran such as hydrogenated dextrans or oxidised dextrans. The term dextran also includes alkali treated dextrans of the type described and claimed in our copending United States application Ser. No. 727,320, filed May 7, 1968.

The proportion of ferric hydroxide to dextran present in the reaction mixture may be varied over a wide range, depending upon the desired iron content and the viscosity which is desired in the final product. However, the process of the invention permits comparatively high ratios of iron to dextran to be achieved without deleteriously affecting the stability of the product. For example it may be possible to obtain satisfactory products with an iron-dextran weight ratio of 1:0.5. There is usually no upper limit to the amount of dextran which may be present, although economics and the viscosity of the product for a given iron content may introduce a practical limit dependent upon the circumstances of each case.

The heating of the solution of the ferric hydroxide and dextran is suitably carried out at a temperature of from 50 to 130° C. for as long as is necessary to produce a stable complex, for example 4 hours at 80° C. However, when the complex is to be sterilised by autoclaving it has been found that the autoclaving also serves to stabilise the complex, i.e. it is not necessary to carry out a separate heating step prior to autoclaving.

The ferric hydroxide-dextran complex may be recovered from the reaction mixture by, for example, solvent precipitation techniques using water miscible materials which are non-solvents for the complex. Suitable materials include lower alcohols, such as methanol, ethanol or isopropanol; or ketones such as acetone or methylethyl ketone.

During the neutralisation of the ferric salt with the alkali, there is produced a by-product salt of the anion of the ferric salt and the cation of the alkali. This salt may be removed at any time after neutralisation of the ferric salt is achieved. This removal may be achieved by dialysis of the reaction mixture against running water or by solvent precipitation techniques using the materials set out above. In this latter case, the precipitate will contain the ferric hydroxide-dextran complex which may, or may not require yet further treatment according to the process of the invention, for example heating to stabilise the product, depending upon the point in the process at which the removal of the salt is carried out.

The ferric hydroxide-dextran complex product (sometimes referred to as an iron-dextran complex) finds use in the treatment of iron-deficiency anaemia. In addition to producing a form of ferric hydroxide which more readily forms complexes with dextran, the process of the invention may yield iron-dextran complexes having a high ratio of iron to dextran, which complexes may be formed into aqueous solutions for therapeutic use having elemental iron contents as high as 250 mg./ml. and also having relatively low viscosities, thus rendering them particularly suitable for administration by injection.

In preparing the complex for therapeutic use the ferric hydroxide-dextran complex may be dissolved in distilled water and the solution adjusted to the desired iron content. Its pH and isotonicity may also be adjusted to the desired value, if necessary, to render the solution suitable for parenteral administration.

In order that the invention may be well understood the following examples are given by way of illustration only.

EXAMPLE 1

A solution containing 5% w./v. Fe was made by dissolving ferric chloride in water. 0.3 vol. of a 32% w./v. solution of sodium carbonate was slowly added over 3 hours at 30–35° C. (67.6% of the theoretical neutralisation).

To 1.215 litres of the above solution containing 48 gm. Fe were added 148 mls. of a solution containing 48 gm. of oxidised dextran, having an average equivalent weight of about 3,000 and obtained by the oxidation of a partially depolymerised dextran with bromine. The solution was adjusted to pH 4.2 with 109 mls. 32% sodium carbonate and the ferric hydroxide-dextran complex precipitated by the addition of ethanol. The precipitate was filtered and washed with more ethanol and then redissolved in water to give a 5% Fe solution. The solution was adjusted to pH 6.0 and heated for 4 hours at 80° C. then concentrated to approximately 10% Fe. Half of this solution was taken and further concentrated to approximately 20% Fe. Analysis of these concentrated solutions gave iron contents of 10.22 and 19.94% w./w. respectively and viscosity at 25° C. of 3.7 and 45.5 centistokes respectively.

The products were well absorbed from the site of injection when injected intramuscularly into a rabbit's hind leg.

EXAMPLE 2

A solution of ferric chloride in hydrochloric acid (20.4% Fe, 112 vols.) was diluted with water to 400 volumes. Sodium carbonate solution (32% w./v. $Na_2CO_3$, 150 vols.) was slowly added to the ferric chloride solution over a period of 2 hours and 8 minutes at 30° C.

To the above solution was then added an oxidised dextran, prepared as in our copending United States application Ser. No. 727,320, filed May 7, 1968 derived from a dextran having a weight average molecular weight of about 5,000 (25 parts in 75 volumes of water) and sufficent sodium carbonate solution (16% $Na_2CO_3$, 55 vols.) was added over a further 55 minutes to bring the pH of the mixture to a value of 4.3 The resultant solution was then dialysed against running water, the pH adjusted to a value of 6.0 with 2.5 N NaOH, the solution redialysed and reneutralised. The neutral solution was autoclaved for 1 hour at 15 lbs./sq. inch pressure and the volume of the autoclaved product reduced to 90 vols. This was then autoclaved at 10 lbs./sq. inch pressure for 30 minutes.

The ferric hydroxide-dextran product contained 20.2% w./v. Fe, 16.2% w./v. dextran, had a dextran to iron ratio of 0.8:1, a solids content of 50.5% w./v. and a viscosity at 25° C. of 26.4 centistokes.

EXAMPLE 3

A low molecular weight dextran (420 parts, weight average molecular weight 5,000) was dissolved in water to give a 22.2% w./v. solution. 10 N sodium hydroxide solution was added to bring the solution of 1 N with respect to the alkali and the mixture heated to 60° C. Further 10 N sodium hydroxide was added to maintain the solution 1 N and the temperature was maintained at 60° C. until there was no further take up of sodium hydroxide. The solution was then neutralised with concentrated hydrochloric acid to pH 7.5, filtered and the sodium salt of the dextran derivative precipitated by the addition of ethanol. The precipitate was redissolved in water and precipitated a further two times.

Sodium carbonate solution (120 vols. of a 30% w./v. solution) was slowly added over 3 hours with constant stirring to a solution of ferric chloride (50.4 parts) in water (159 volumes). The temperature of the mixture was kept at 30° C. The pH at the end of the addition was 1.55.

An aqueous solution of the sodium salt of the dextran derivative prepared above (104 volumes of 20.5 w./v. solution) was then added in a similar manner over 1.5 hours. Sodium carbonate solution (75 volumes of 16% solution) was added to bring the pH of the final solution to 4.3.

The ferric hydroxide-dextran complex was precipitated by the addition of ethanol and the precipitate collected by centrifuging. After washing three times with ethanol, the precipitate was dissolved in distilled water (500 vols.), the pH adjusted to 6.0 by the addition of 10% aqueous sodium hydroxide solution and the solution heated at 90° C. for 2 hours. Further alkali was added during the heating to maintain the pH in the range 5.9 to 6.0.

The solution was concentrated under vacuum at 45° C. to 100 volumes, filtered and autoclaved for 30 minutes.

The product contained 15.6% w./v. Fe and a total solids content of 40.5%.

We claim:
1. A process for the preparation of a ferric hydroxide-dextran complex, which process comprises forming an aqueous solution of a water-soluble ferric salt, slowly neutralizing the solution by the addition of an alkali at such a rate that from 10 to 90% of the ferric salt is converted to colloidal ferric hydroxide in not less than 30 minutes, the neutralization being carried out at a temperature of from 20–40° C.; thereafter adding an aqueous solution of a dextran directly to the resultant solution and adjusting the pH of the solution to a value of from 4 to 7; and subsequently heating the solution at a temperature of the least 50° C. for a sufficient period to effect the formation of a stable ferric hydroxide-dextran complex.

2. The process of claim 1 wherein from 50 to 80% of the ferric salt is neutralized in not less than 30 minutes.

3. The process of claim 1 wherein the dextran used has a weight average molecular weight of from 500 to 50,000.

4. The process of claim 3 wherein the dextran is a modified dextran.

5. The process of claim 1 wherein the solution is heated at from 50 to 130° C. to form the ferric hydroxide-dextran complex.

6. The process of claim 1 wherein the salt by-product of the neutralization of the ferric salt is removed from the reaction mixture.

7. The process of claim 6 wherein the salt removal is effected by treating the reaction mixture with a water miscible material which is a non-solvent for the dextran which is present.

References Cited

UNITED STATES PATENTS 3,022,221  2/1962  Floramo _____ 260—209D
3,234,209  2/1966  Floramo _____ 260—209D LEWIS GOTTS, Primary Examiner J. R. BROWN, Assistant Examiner U.S. Cl. X.R.

424—180